(12) United States Patent
Brenner et al.

(10) Patent No.: US 11,853,355 B2
(45) Date of Patent: *Dec. 26, 2023

(54) INSERTING INFORMATION INTO PLAYING CONTENT

(71) Applicant: GRACENOTE, INC., Emeryville, CA (US)

(72) Inventors: Vadim Brenner, San Francisco, CA (US); Markus K. Cremer, Orinda, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,252

(22) Filed: Dec. 19, 2022

(65) Prior Publication Data

US 2023/0229697 A1     Jul. 20, 2023

Related U.S. Application Data

(63) Continuation of application No. 17/526,949, filed on Nov. 15, 2021, now Pat. No. 11,531,699, which is a continuation of application No. 17/001,229, filed on Aug. 24, 2020, now Pat. No. 11,176,195, which is a continuation of application No. 16/417,317, filed on May 20, 2019, now Pat. No. 10,754,891, which is a continuation of application No. 14/020,480, filed on Sep. 6, 2013, now Pat. No. 10,318,579.

(51) Int. Cl.
*G06F 16/683* (2019.01)
*G11B 27/11* (2006.01)
*G11B 27/036* (2006.01)

(52) U.S. Cl.
CPC ......... *G06F 16/683* (2019.01); *G11B 27/036* (2013.01); *G11B 27/11* (2013.01)

(58) Field of Classification Search
CPC .................................................... G06F 16/683
See application file for complete search history.

(56) References Cited

U.S. PATENT DOCUMENTS

| | | |
|---|---|---|
| 6,898,517 B1 | 5/2005 | Froeberg |
| 8,020,000 B2 | 9/2011 | Costveen et al. |
| 8,645,991 B2 | 2/2014 | McIntire et al. |
| 8,863,165 B2 | 10/2014 | Gordon |
| 8,997,164 B2 | 3/2015 | Gordon et al. |
| 9,015,741 B2 | 4/2015 | Gordon |
| 9,147,112 B2 | 9/2015 | Lienhart et al. |
| 9,161,074 B2 | 10/2015 | Khader et al. |
| 9,167,312 B2 | 10/2015 | Archer |

(Continued)

FOREIGN PATENT DOCUMENTS

| | | |
|---|---|---|
| KR | 10-0740074 B1 | 7/2007 |
| WO | 01/76249 A1 | 10/2001 |

OTHER PUBLICATIONS

Pradeep, "Integrated Advertising in Audio Media," U.S. Appl. No. 61/882,672, filed Sep. 26, 2013, 14 pages.

(Continued)

*Primary Examiner* — Roland J Casillas
(74) *Attorney, Agent, or Firm* — McDonnell Boehnen Hulbert & Berghoff LLP

(57) ABSTRACT

Example methods and systems for inserting information into playing content are described. In some example embodiments, the methods and systems may identify a break in content playing via a playback device, select an information segment representative of information received by the playback device to present during the identified break, and insert the information segment into the content playing via the playback device upon an occurrence of the identified break.

20 Claims, 7 Drawing Sheets

(56) References Cited

U.S. PATENT DOCUMENTS

| | | | |
|---|---|---|---|
| 9,510,044 | B1 | 11/2016 | Pereira et al. |
| 9,525,897 | B2 | 12/2016 | Meembat |
| 9,615,142 | B2 | 4/2017 | Abecassis et al. |
| 9,626,798 | B2 | 4/2017 | Zavesky |
| 9,665,644 | B1 | 5/2017 | Song et al. |
| 9,666,227 | B2 | 5/2017 | Cameron et al. |
| 9,794,642 | B2 | 10/2017 | Dunker et al. |
| 10,318,579 | B2 | 6/2019 | Brenner et al. |
| 10,754,891 | B2 | 8/2020 | Brenner et al. |
| 11,176,195 | B2 | 11/2021 | Brenner et al. |
| 2002/0016736 | A1 | 2/2002 | Cannon et al. |
| 2003/0037068 | A1 | 2/2003 | Thomas et al. |
| 2003/0226142 | A1 | 12/2003 | Rand |
| 2004/0237102 | A1 | 11/2004 | Konig et al. |
| 2005/0149968 | A1 | 7/2005 | Konig et al. |
| 2005/0172312 | A1 | 8/2005 | Lienhart et al. |
| 2005/0177847 | A1 | 8/2005 | Konig et al. |
| 2006/0187358 | A1 | 8/2006 | Lienhart et al. |
| 2006/0195860 | A1 | 8/2006 | Eldering et al. |
| 2006/0248569 | A1 | 11/2006 | Lienhart et al. |
| 2007/0217648 | A1 | 9/2007 | Muehlbauer |
| 2007/0266410 | A1 | 11/2007 | Balfanz et al. |
| 2008/0077952 | A1 | 3/2008 | St. Jean et al. |
| 2008/0189735 | A1 | 8/2008 | Barton et al. |
| 2008/0209351 | A1 | 8/2008 | Macadaan et al. |
| 2008/0256109 | A1 | 10/2008 | Irvin et al. |
| 2009/0077580 | A1 | 3/2009 | Konig et al. |
| 2010/0107188 | A1 | 4/2010 | van Hoff |
| 2010/0153993 | A1 | 6/2010 | Konig et al. |
| 2010/0205049 | A1* | 8/2010 | Long .................. G06Q 30/0252 705/14.5 |
| 2011/0231261 | A1 | 9/2011 | Sattaru et al. |
| 2011/0258211 | A1 | 10/2011 | Kalisky et al. |
| 2012/0072960 | A1 | 3/2012 | Rosenberg et al. |
| 2012/0176872 | A1 | 7/2012 | Waites |
| 2012/0271713 | A1* | 10/2012 | Nussel ............... G06Q 30/0241 705/14.53 |
| 2013/0205330 | A1 | 8/2013 | Sinha et al. |
| 2014/0123173 | A1* | 5/2014 | Mak ................... G06Q 30/0249 725/32 |
| 2014/0143803 | A1 | 5/2014 | Narsimhan et al. |
| 2014/0201004 | A1* | 7/2014 | Parundekar ........ G06Q 30/0271 705/14.62 |
| 2015/0074526 | A1 | 3/2015 | Brenner et al. |
| 2015/0262613 | A1 | 9/2015 | Demerchant et al. |
| 2019/0272288 | A1 | 9/2019 | Brenner et al. |
| 2022/0171803 | A1 | 6/2022 | Brenner et al. |

OTHER PUBLICATIONS

United States Patent and Trademark Office, "Non-Final Office Action," issued in connection with U.S. Appl. No. 14/020,480, dated Jun. 3, 2015, 17 pages.

United States Patent and Trademark Office, "Final Office Action," issued in connection with U.S. Appl. No. 14/020,480, dated Nov. 20, 2015, 18 pages.

United States Patent and Trademark Office, "Non-Final Office Action," issued in connection with U.S. Appl. No. 14/020,480, dated Jul. 26, 2016, 25 pages.

United States Patent and Trademark Office, "Final Office Action," issued in connection with U.S. Appl. No. 14/020,480, dated Apr. 13, 2017, 27 pages.

United States Patent and Trademark Office, "Advisory Action," issued in connection with U.S. Appl. No. 14/020,480, dated Jun. 27, 2017, 3 pages.

United States Patent and Trademark Office, "Non-Final Office Action," issued in connection with U.S. Appl. No. 14/020,480, dated Sep. 28, 2017, 27 pages.

United States Patent and Trademark Office, "Final Office Action," issued in connection with U.S. Appl. No. 14/020,480, dated Feb. 12, 2018, 28 pages.

United States Patent and Trademark Office, "Non-Final Office Action," issued in connection with U.S. Appl. No. 14/020,480, dated Jul. 20, 2018, 24 pages.

United States Patent and Trademark Office, "Notice of Allowance," issued in connection with U.S. Appl. No. 14/020,480, dated Jan. 22, 2019, 11 pages.

Gordon, "Method and System for Remotely Controlling Media Systems," U.S. Appl. No. 61/170,586, filed Apr. 17, 2009, 54 pages.

Gordon, "Method and System for Remotely Controlling Consumer Electronic Devices," U.S. Appl. No. 61/293,798, filed Jan. 11, 2010, 91 pages.

Gordon, "Method and System for Presenting Additional Content at a Media System," U.S. Appl. No. 61/409,018, filed Nov. 1, 2010, 161 pages.

Pereira, "TV Content Segmentation, Categorization and Identification and Time-Aligned Applications," U.S. Appl. No. 61/423,205, filed Dec. 15, 2010, 45 pages.

Gordon, "Inserting Advertisements Into Video Content," U.S. Appl. No. 61/749,518, filed Jan. 7, 2013, 31 pages.

Gordon, "Authorizing Devices Based on Identifying Content Distributor," U.S. Appl. No. 61/749,524, filed Jan. 7, 2013, 31 pages.

United States Patent and Trademark Office, "Notice of Allowance," issued in connection with U.S. Appl. No. 16/417,317, dated Apr. 17, 2020, 9 pages.

United States Patent and Trademark Office, "Notice of Allowance," issued in connection with U.S. Appl. No. 16/417,317, dated Dec. 19, 2019, 9 pages.

United States Patent and Trademark Office, "Non-Final Office Action," issued in connection with U.S. Appl. No. 16/417,317, dated Sep. 4, 2019, 7 pages.

United States Patent and Trademark Office, "Notice of Allowance," issued in connection with U.S. Appl. No. 17/001,229, dated May 20, 2021, 9 pages.

* cited by examiner

INSERTING INFORMATION INTO PLAYING CONTENT

RELATED APPLICATIONS

This patent is a continuation of U.S. patent application Ser. No. 17/526,949, filed Nov. 15, 2021, entitled "INSERTING INFORMATION INTO PLAYING CONTENT," which is a continuation of U.S. patent application Ser. No. 17/001,229, filed Aug. 24, 2021, entitled "INSERTING INFORMATION INTO PLAYING CONTENT," now U.S. Pat. No. 11,176,195, which is a continuation of U.S. patent application Ser. No. 16/417,317, filed May 20, 2019, entitled "INSERTING INFORMATION INTO PLAYING CONTENT," now U.S. Pat. No. 10,754,891. U.S. patent application Ser. No. 16/417,317, filed May 20, 2019, entitled "INSERTING INFORMATION INTO PLAYING CONTENT," now U.S. Pat. No. 10,754,891, is a continuation of U.S. patent application Ser. No. 14/020,480, filed Sep. 6, 2013, entitled "INSERTING INFORMATION INTO PLAYING CONTENT," now U.S. Pat. No. 10,318,579. Priority to U.S. patent application Ser. No. 14/020,480; U.S. patent application Ser. No. 16/417,317; U.S. patent application Ser. No. 17/001,229; and U.S. patent application Ser. No. 17/526,949 is hereby claimed. U.S. patent application Ser. No. 14/020,480; U.S. patent application Ser. No. 16/417,317; U.S. patent application Ser. No. 17/001,229; and U.S. patent application Ser. No. 17/526,949 are incorporated by reference in their entireties.

TECHNICAL FIELD

The subject matter disclosed herein generally relates to the processing of data. Specifically, the present disclosure addresses systems and methods for inserting information into playing content.

BACKGROUND

Many of the devices we use on a daily basis, such as cars, mobile phones, televisions, and so on, are capable of functioning in a variety of ways other than as their primary function. For example, a car takes us from one location to another, but also plays music; and a mobile phone lets us call and speak to others, but also plays music, takes pictures, and facilitates access to vast amounts of information. At times, it can be difficult and/or cumbersome to harness the many functions of these devices in an efficient and useful manner. However, changing settings or preferences on a car stereo, car phone or interacting with a car navigation system while driving may pose safety issues. Further, certain functionality that may be preferable may be interrupted by other functions that a device performs. For example, voice guided navigation commands may be interrupted by an incoming phone call.

BRIEF DESCRIPTION OF THE DRAWINGS

Some embodiments are illustrated by way of example and not limitation in the figures of the accompanying drawings.

DETAILED DESCRIPTION

Overview

Example methods and systems for inserting information into playing content are described. In some example embodiments, the methods and systems may identify a break in content playing via a playback device, select an information segment representative of information associated with the playback device to present during the identified break, and insert the information segment into the content playing via the playback device upon an occurrence of the identified break.

For example, the methods and systems may determine a radio broadcast is playing on a car stereo system of a car, obtain current traffic information from a traffic information resource for a current route of travel for the car and, when a currently playing song ends, cause the car stereo system to play the traffic information. As another example, the methods and systems may determine a podcast or audio book is playing on a mobile device (e.g., smart phone), select an unread email from a contact of a user associated with the mobile device, and, when there is a break in the podcast, cause the mobile device to present an audio version of the email. Another example is to detect if the radio station is in the middle of a commercial and wait for the commercial break to insert directions or to read the email once the commercial is over. Or, another example is when a user is driving by a point of interest, and the point of interest has an advertisement campaign, then a specific advertisement associated with the advertisement campaign may be inserted into the audio stream at a point when there is a suitable position or break in the currently playing audio programming.

Therefore, the methods and systems may provide information (e.g., current news, messages, status information, and so on) to a user who is currently listing, viewing, or otherwise consuming content during breaks or other suitable positions in the content, facilitating the delivery of the information in a seamless and unobtrusive manner, among other things. In an example embodiment, time shifting is enabled/performed when the audio break occurs and the playing of the audio content may catch up. The playing of the audio may catch up to the real-time broadcast over time, during breaks in programming, or dropping segments. An example of a dropped segment could be a commercial or a song, especially if the song that is pending does not fit the consumer's profile based on listening history, likes/dislikes, etc.

In the following description, for purposes of explanation, numerous specific details are set forth to provide a thorough understanding of example embodiments. It will be evident to one skilled in the art, however, that the present subject matter may be practiced without these specific details.

Example Network Environment

Figure 1:
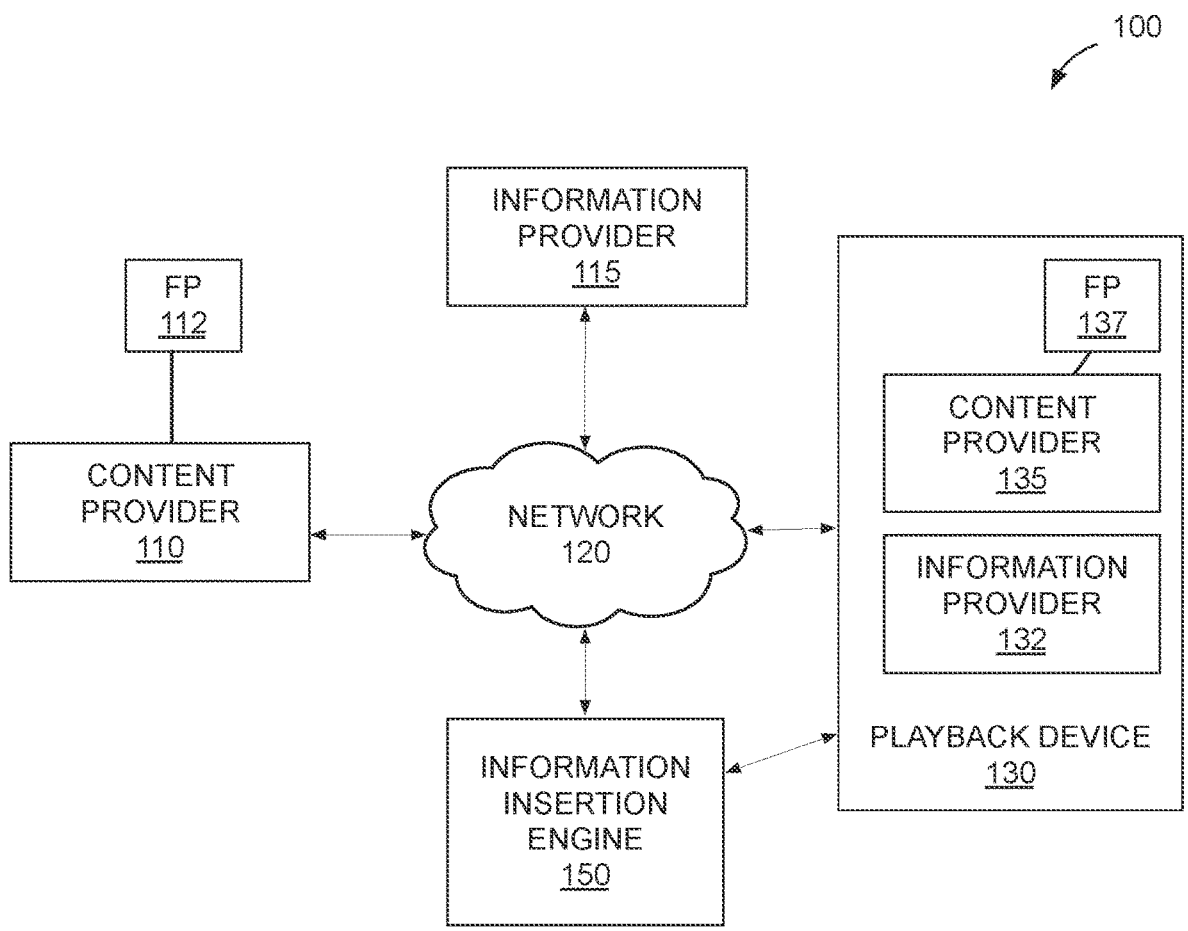
FIG. 1 is a network diagram illustrating a network environment suitable for inserting information into playing content, according to some example embodiments.

FIG. 1 is a network diagram illustrating a network environment for inserting information into playing content, according to some example embodiments. The network environment 100 may include a playback device 130 that receives content, such as content from a content provider 110 over a network 120 (e.g., the Internet) and/or from a locally stored content provider 135.

The content provider 110 or the content provider 135 may be a content source (e.g., a broadcaster, a network, a website, an app, and so on) that provides various types of multimedia content, such as audio content and/or video content. Example content providers 110 and 135 include terrestrial or satellite radio stations, online music services, online video services, television broadcasters and/or distributors, networked computing devices (e.g., mobile devices on a network), local video, audio or music applications, and so on.

The playback device 130 may also receive information, such as information from an information provider 115 over the network 120 and/or from a locally stored information provider 132. The information provider 115 or the information provider 132 may be an information source (e.g., an online, networked, or locally stored news source, social network service, messaging application, status source, and so on) that provides information to the playback device 130. It should be noted that the content (e.g., audio and/or video content) may be obtained from any source. For example, the term "content source" is intended to include users, and other content owners (such as artists, labels, movie studios, etc.). In an example embodiment, the content source is a publicly accessible website such as YouTube™. Further, part of or all the content may be stored locally on the device itself thus, in certain embodiments, not necessitating network connectivity.

The networked environment 100 facilitates the communication of content, information, and other data between the playback device 130, the content provider 110, and/or the information provider 115 via the network 120, which may be any network or communication medium that enables communication between the content provider 110, the information provider 115, the playback device 130, and other networked devices. For example, the network 120 may be or include a wired network, a wireless network (e.g., a mobile network), a radio or telecommunications network, a satellite network, and so on. The network 120 may include one or more portions that constitute a private network (e.g., a cable television network or a satellite radio network), a public network (e.g., over-the-air broadcast channels or the Internet), a car area network (CAN), and so on.

The playback device 130 may include audio or video playback devices, such as car or personal stereo systems, televisions, set-top boxes, laptops and other personal computers, tablets and other mobile devices (e.g., smart phones), gaming devices, and/or other devices capable of receiving and presenting a stream of audio or video content. In some example embodiments, the playback device 130 may include a tuner configured to receive a stream of audio or video content. The playback device 130 plays the stream of audio or video content by processing the stream and outputting information (e.g., digital or analog) to a display of the playback device 130 used to present or play back audio or video content, information, and so on, to a user associated with the playback device 130. The playback device 130 may also include a display or other user interfaces configured to display the processed stream of content and/or associated metadata. The display may be a flat-panel screen, a plasma screen, a light emitting diode (LED) screen, a cathode ray tube (CRT), a liquid crystal display (LCD), a projector, and so on.

In some example embodiments, the content provider 110 and/or the playback device 130 may include one or more fingerprint generators 112 or fingerprint generators 137 configured to generate identifiers for content being transmitted or broadcast by the content provider 110 or 135 and/or received or accessed by the playback device 130. For example, the fingerprint generators 112 or 137 may include a reference fingerprint generator (e.g., a component that calculates a hash value from a portion of content) that is configured to generate reference fingerprints or other identifiers of received content, among other things.

In some example embodiments, the playback device 130 may include or be associated with an information insertion engine 150 configured to insert information into currently playing content. For example, the information insertion engine 150 may include components or modules that identify breaks or other suitable times within playing content, select information segments of interest to a user of the playback device 130, and cause the information segments to be presented to the user at or during the identified breaks, among other things.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 7. As used herein, a "database" is a data storage resource and may store data structured as a text file, a table, a spreadsheet, a relational database, a triple store, or any suitable combination thereof. Moreover, any two or more of the machines illustrated in FIG. 1 may be combined into a single machine, and the functions described herein for any single machine may be subdivided among multiple machines.

Furthermore, any of the modules, systems, and/or generators may be located at any of the machines, databases, or devices shown in the FIG. 1. For example, the information insertion engine 150 may be part of the content provider 110 and/or the playback device 130 (e.g., part of a CAN). As another example, the playback device 130 may include the content provider 110 (e.g., the playback device 130 is a mobile device having a music playback application and the content provider 110 is a local store of songs and other audio) and/or the information provider 115 (e.g., the information provider 115 is a calendar application or messaging application), among other configurations.

Examples of Inserting Information into Playing Content

Figure 2:
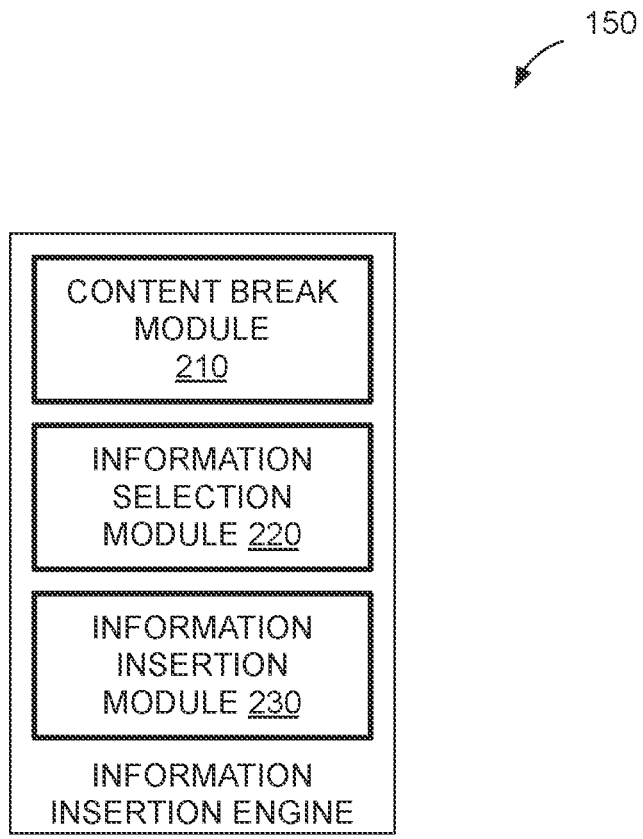
FIG. 2 is a block diagram illustrating components of an information insertion engine, according to some example embodiments.

As described herein, in some example embodiments, the systems and methods broadcast, play, or otherwise insert information into determined breaks of content playing via the playback device 130, among other things. FIG. 2 is a block diagram illustrating components of the information insertion engine 150, according to some example embodiments.

One or more of the modules described herein may be implemented using hardware (e.g., a processor of a machine) or a combination of hardware and software. Moreover, any two or more of these modules may be combined into a single module, and the functions described herein for a single module may be subdivided among multiple modules. Referring to FIG. 2, the information insertion engine 150 may include a content break module 210, an information selection module 220, and an information insertion module 230. One or more of the modules 210, 220 or 230 may be provided at a remote server, a third-party server or at any other location.

In some example embodiments, the content break module 210 is configured and/or programmed to identify a break in content playing via the playback device 130. For example, the content break module 210 may identify a break in content by comparing a fingerprint of the playing content to a group of reference fingerprints to identify the content, and any breaks, playing via the playback device 130, may identify the break in content based on metadata associated with the playing content, may identify the break in content based on audio and/or video characteristics of the playing content, and so on.

In some example embodiments, the information selection module 220 is configured and/or programmed to select an information segment representative of information associated with the playback device 130 to present during the identified break. Examples of information segments representative of information associated with the playback device 130 include information segments based on information captured or received by a messaging application of the playback device 130 (e.g., a mail client or app of a mobile device), information captured by a location determination component of the playback device 130 (e.g., a GPS device within a car area network), and/or other information stored, contained, received and/or captured by other components of the playback device 130 that are not associated with playing content.

The information selection module 220 may select the information segment based on a variety of factors. For example, the information selection module 220 may rank or assign a ranking to multiple information segment options, such as a ranking based on a current importance of an information segment relative to other information segments, determine a time window for the identified break, and select one or more information segments to insert into the playing content based on the assigned rankings and based on the determined time window. As another example, the information selection module 220 may identify a type of device for the playback device 130, and select an information segment to insert into the content playing via the playback device 130 that is associated with the type of device of the playback device 130. For example, the information selection module 220 may determine the playback device 130 is a car stereo and select an information segment that presents traffic updates, or may determine that the playback device 130 is a mobile device and select an information segment that is associated with a message received via a messaging application of the mobile device, among other things.

As another example, the information selection module 220 may determine a break type for the break in content, and select an information segment based on the determined break type. For example, the information selection module 220 may determine a break is associated with a break type having a limited time frame or window (e.g., similar to a commercial break), and select an information segment that fits within the time frame or window.

In some example embodiments, the information insertion module 230 is configured and/or programmed to insert the information segment into the content playing via the playback device 130 upon an occurrence of the identified break.

For example, the information insertion module 230 may insert the information segment between pieces of content that make up the content playing via the playback device 130, may replace a portion of the playing content with the information segment, may play the information segment over a portion of the playing content that follows the identified break in the playing content, and so on.

Figure 3:
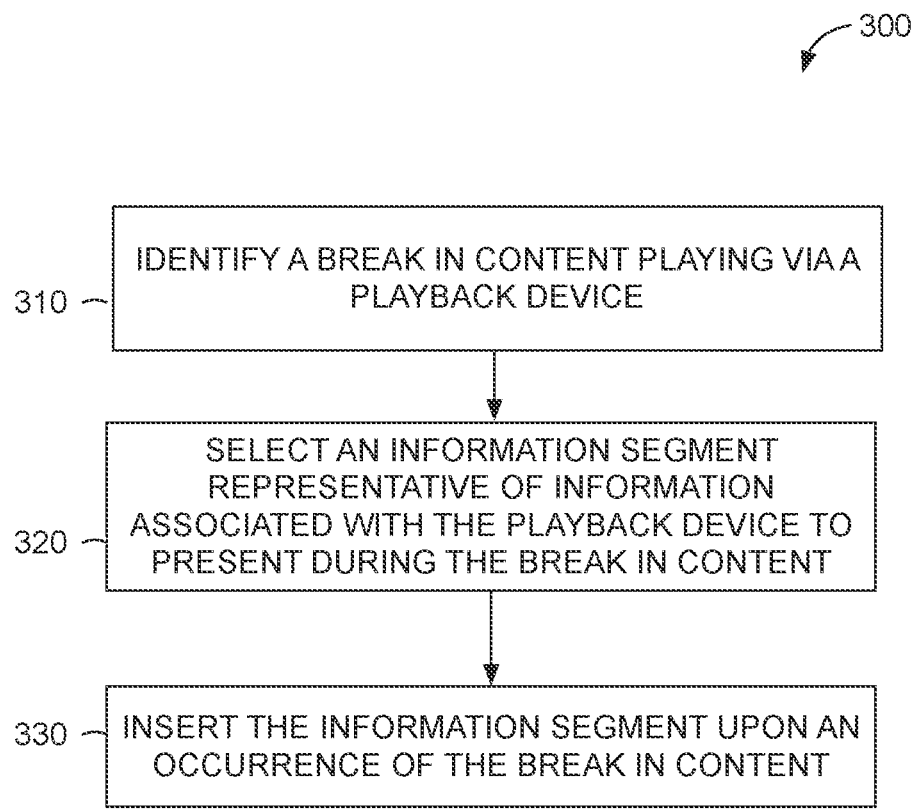
FIG. 3 is a flow diagram illustrating an example method for inserting information into playing content, according to some example embodiments.

As described herein, the information insertion engine 150 may perform various methods or processes when inserting information segments into playing content. FIG. 3 is a flow diagram illustrating an example method 300 for inserting information into playing content, according to some example embodiments. The method 300 may be performed by the information insertion engine 150 and, accordingly, is described herein merely by way of reference thereto. It will be appreciated that the method 300 may be performed on any suitable hardware.

In operation 310, the information insertion engine 150 identifies a break in content playing via the playback device 130. For example, the content break module 210 may identify a break in content by comparing a fingerprint of the playing content to a group of reference fingerprints (e.g., embedded on the playback device 130 and/or stored in the cloud) to identify the content and any breaks playing via the playback device 130, may identify the break in content based on metadata associated with the playing content, may identify the break in content based on audio and/or video characteristics of the playing content, and so on.

In operation 320, the information insertion engine 150 selects an information segment representative of information associated with the playback device 130 to present during the identified break. As described herein, example information segments that may be selected include information segments based on information captured or received by non-content playback components of the playback device 130, such as messaging components or applications, location determination components or applications, device status components or applications, information presentation components or applications, and so on.

For example, the information selection module 220 may select the information segment based on a variety of factors, such as factors associated with a selection priority for available information segments, factors based on the type of playback device 130, factors based on a type of the identified break, factors based on a user associated with the playback device 130, and so on.

Figure 4:
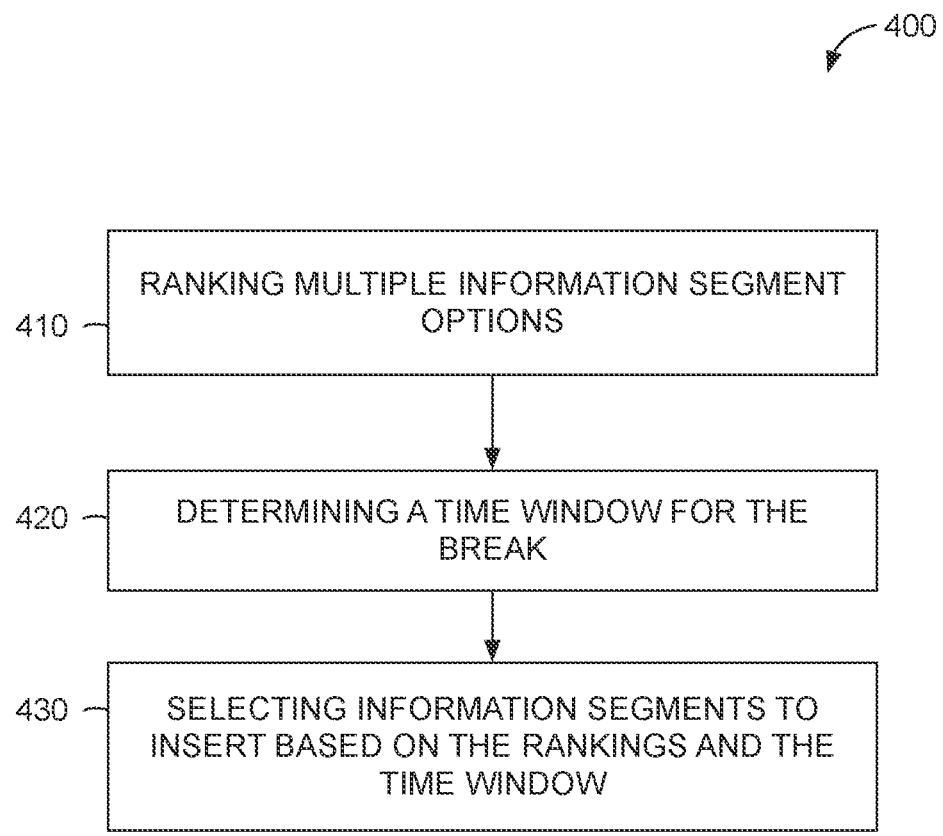
FIG. 4 is a flow diagram illustrating an example method for selecting information to be inserted based on a ranking of selectable information segments, according to some example embodiments.

As described herein, in some example embodiments, the information insertion engine 150 selects an information segment based on a ranking of available information segments. FIG. 4 is a flow diagram illustrating an example method 400 for selecting information to be inserted based on a ranking of selectable information segments, according to some example embodiments. The method 400 may be performed by the information insertion engine 150 and, accordingly, is described herein merely by way of reference thereto. It will be appreciated that the method 400 may be performed on any suitable hardware.

In operation 410, the information insertion engine 150 assigns a ranking to multiple information segment options, the ranking based on a current importance of an information segment relative to other information segments. For example, the information selection module 220 may rank available information segments based on a priority of playing the information segment to a user associated with the playback device 130, such as a priority associated with a timeliness of playing the information segment (e.g., an information segment for a traffic update or fuel status), an importance of the information segment (e.g., an urgent message from a spouse or child), and so on.

In operation 420, the information insertion engine 150 determines a time window for the identified break. For example, the information selection module 220 may determine the identified break has a certain time window, based on knowledge that the playing content is live and will begin to play after a certain time, and/or has an unlimited time window, based on knowledge that new content is recorded or stored, and may be played at any time, among other things.

In operation 430, the information insertion engine 150 selects one or more information segments to insert into the playing content based on the assigned rankings and based on the determined time window. For example, the information selection module 220 may select a high or top ranked information segment that fits into a determined time window for the identified break.

In an example embodiment, the playback device 130 can communicate to other devices how long it will be busy with the current playback. The decisioning on when and what content to insert may then be determined by one or more other devices based on this time duration information. For example, if a car radio starts to play a song and its duration is known, the car radio can let the navigation system know that the song will be over after a certain time. The navigation system can then queue up all the updates to the driver for upcoming directions or points of interest. In this example embodiment, the insertion management may still be done on the car radio but the navigation system (or the other device) can provide more or less information given the schedule and driving speed to destination.

Figure 5:
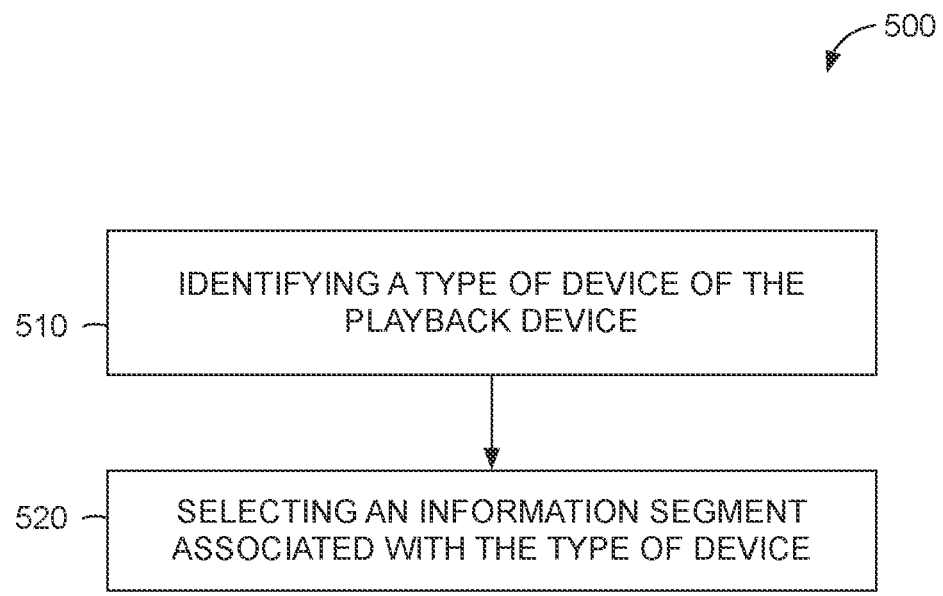
FIG. 5 is a flow diagram illustrating an example method for selecting information to be inserted based on a playback device, according to some example embodiments.

As described herein, in some example embodiments, the information insertion engine 150 selects an information segment based on the playback device 130. FIG. 5 is a flow diagram illustrating an example method 500 for selecting information to be inserted based on the playback device 130, according to some example embodiments. The method 500 may be performed by the information insertion engine 150 and, accordingly, is described herein merely by way of reference thereto. It will be appreciated that the method 500 may be performed on any suitable hardware.

In operation 510, the information insertion engine 150 identifies a type of device of the playback device 150. For example, the information selection module 220 may determine the playback device 130 is a mobile device, a car stereo, a home stereo, and so on. In an example embodiment, the information insertion engine 150 identifies automated actions that are triggered by the insertions, such as lowering the volume, time shifting the programming source, choosing a voice type or display design to be used based on programming content, etc. The voice type can be modified based on the artist performing the song, voice type that best represents the mood, location, voice type that best offsets the acoustic environment, etc. Display settings can be modified based on themes, content type being inserted, etc.

In operation 520, the information insertion engine 150 selects an information segment to insert into the content playing via the playback device 130 that is associated with the type of device of the playback device 130. For example, the information selection module 220 may select an information segment associated with a mobile device (e.g., an information segment associated with a message received by the mobile device) when the playback device 130 is a mobile device, among other things.

Figure 6:
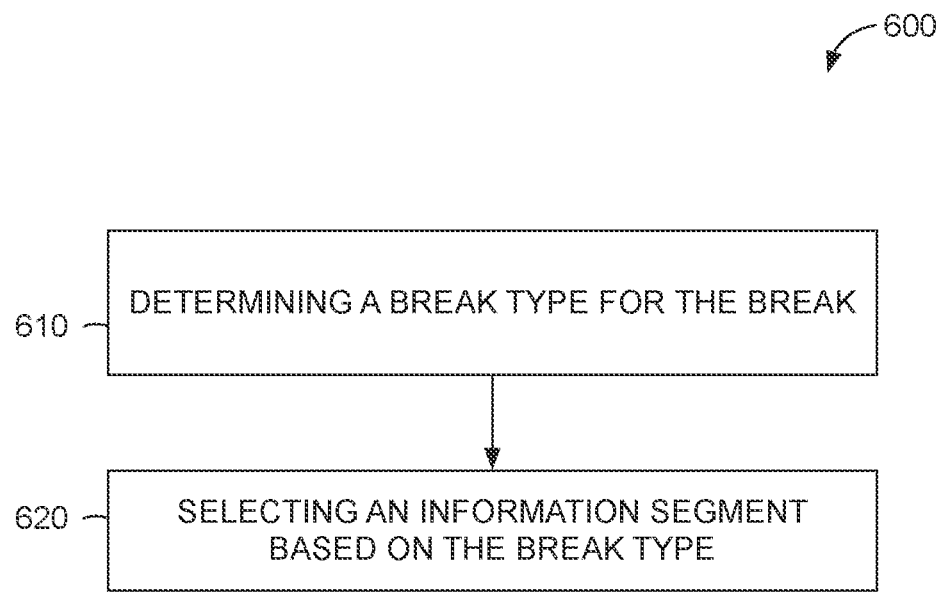
FIG. 6 is a flow diagram illustrating an example method for selecting information to be inserted based on characteristics of a break in playing content, according to some example embodiments.

As described herein, in some example embodiments, the information insertion engine 150 selects an information segment based on the characteristics of the identified break. FIG. 6 is a flow diagram illustrating an example method 600 for selecting information to be inserted based on the characteristics of a break in playing content, according to some example embodiments. The method 600 may be performed by the information insertion engine 150 and, accordingly, is described herein merely by way of reference thereto. It will be appreciated that the method 600 may be performed on any suitable hardware.

In operation 610, the information insertion engine 150 determines a break type for the break in content. For example, the information selection module 220 may determine the identified break is associated with a certain time window within a live broadcast of content, and/or the identified break is the end of currently playing content (e.g., the end of a song) stored on the playback device 130 and may have an unlimited or unbounded time window.

In operation 620, the information insertion engine 150 selects an information segment based on the determined break type. For example, the information selection module 220 may select an information segment associated with the break type, such as an information segment that fits within a time window associated with the break and/or an information segment that is a segment of unknown length when the break is associate with the end of playing content (e.g., the break is the end of the content), among other things.

Returning back to FIG. 3, in operation 330, the information insertion engine 150 inserts the information segment into the content playing via the playback device 130 upon an occurrence of the identified break. For example, the information insertion module 230 may insert the information segment between pieces of content that make up the content playing via the playback device 130, may replace a portion of the playing content with the information segment, may play the information segment over a portion of the playing content that follows the identified break in the playing content, and so on.

Thus, in some example embodiments, the information insertion engine 150 performs various methods or processes to identify breaks in playing content and insert or otherwise play selected information segments at or during the identified breaks, among other things. The information insertion engine 150 may perform such insertions of information in a variety of scenarios, including:

Identifying the end of a song playing via a car stereo and inserting a traffic report obtained from a web-based resource on a network that includes the car stereo;

Identifying a suitable portion of an audio stream/programming playing via a car stereo and inserting navigation information obtained from a global positioning device on a network that includes the car stereo;

Identifying an end of a song playing on a current station via a car stereo and switching to a new song playing on a different station or a local source to continue with the similar or desired playback experience for the user;

Identifying an end of a song playing via a mobile device and inserting a message provided by a messaging application supported by the mobile device;

Identifying an end of a song playing via a mobile device and inserting a news segment obtained from a web-based resource on a network that includes the mobile device; and/or Identifying a break in TV programming to automatically switch to another source that may be live programming, time shifted broadcast or pre-recorded content, local or in the cloud.

Of course, the information insertion engine 150 may be utilized in other scenarios with other playback devices 130.

Figure 7:
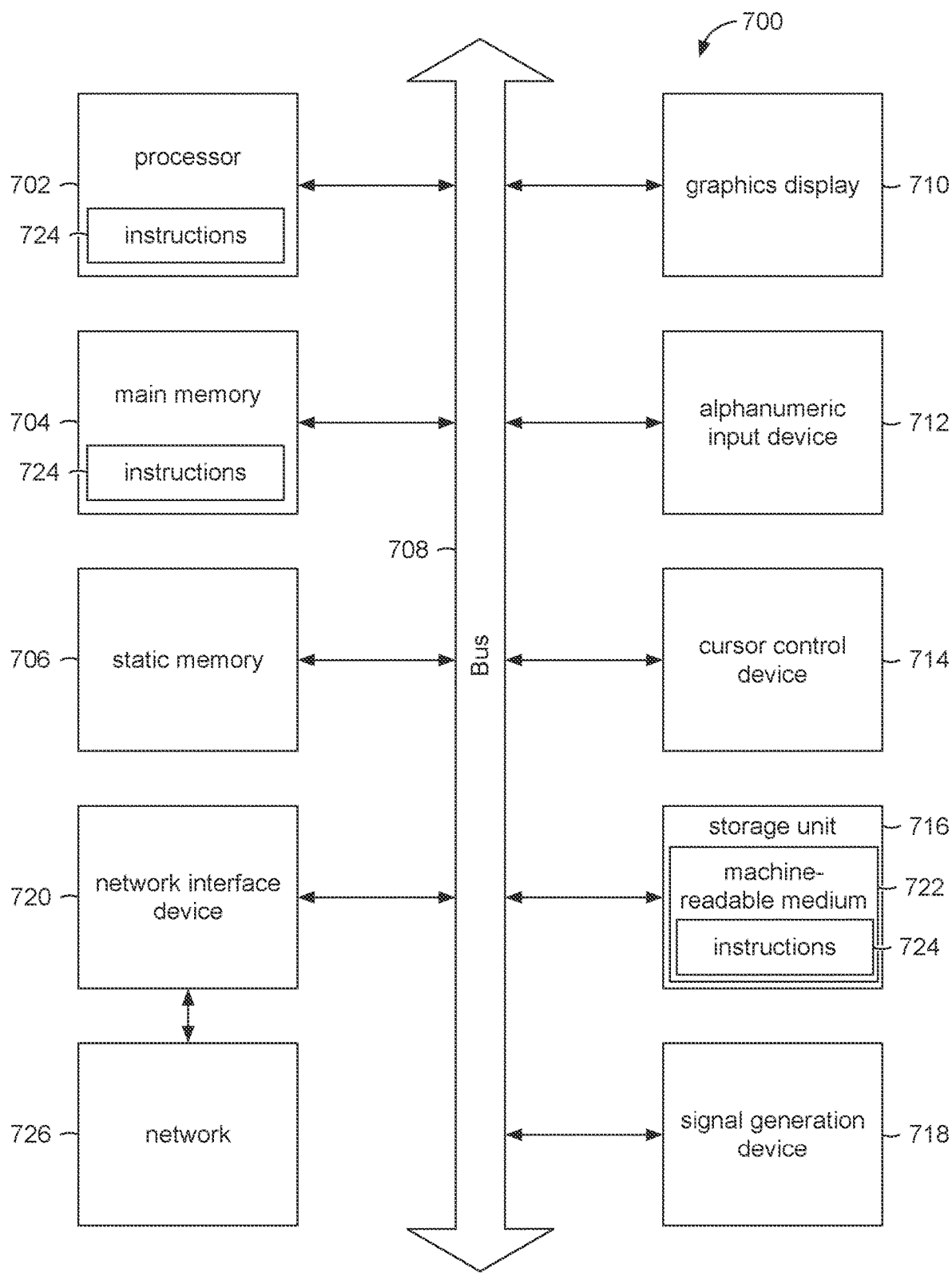
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system and within which instructions 724 (e.g., software) for causing the machine 700 to perform any one or more of the methodologies discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer, a tablet computer, a laptop computer, a netbook, an set top box, a personal digital assistant, a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704 and a static memory 706, which are configured to communicate with each other via a bus 708. The machine 700 may further include a graphics display 710 (e.g., a plasma display panel (PDP), an LED display, an LCD, a projector, or a CRT). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 (e.g., network 120 of FIG. 1) via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., software) for execution by the machine (e.g., machine 700), such that the instructions (e.g., 724), when executed by one or more processors of the machine (e.g., processor 702), cause the machine (e.g., 700) to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may, accordingly, configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   accessing, by a computing device and via a network, a fingerprint and information associated with a playback device, the fingerprint generated by the playback device in response to presentation of content by the playback device;
   comparing, by the computing device, the fingerprint to one or more reference fingerprints to identify the content, the one or more reference fingerprints corresponding to respective different media;
   identifying, by the computing device, a break in the content based on the identified content;
   selecting, by the computing device, an information segment to be inserted in the break in the content based on the information associated with the playback device; and
   causing, by the computing device, transmission of the information segment to the playback device via the network.

2. The method of claim 1, further comprising:
   identifying, by the computing device, the break in the content based on metadata associated with the content.

3. The method of claim 1, further comprising:
   selecting, by the computing device, the information segment based on at least one of a ranking of the information segment relative to one or more other information segments or a time window of the break.

4. The method of claim 3, wherein the ranking of the information segment is based on a priority of the information segment relative to the one or more other information segments, the priority associated with a timeliness of presenting the information segment.

5. The method of claim 1, further comprising:
   selecting, by the computing device, the information segment based on a break type for the break in the content.

6. The method of claim 1, wherein the information associated with the playback device includes a type of device of the playback device.

7. The method of claim 1, wherein:
the playback device includes at least one of (1) a car stereo system of a car or (2) a mobile device; and
the information segment includes at least one of (a) current traffic information for a current route of travel for the car, (b) a representation of an unread communication from a contact associated with the mobile device, or (c) an advertisement associated with an advertisement campaign of a point of interest in spatial proximity to the playback device.

8. A computing system comprising:
a processor; and
a non-transitory computer-readable storage medium, having stored thereon program instructions that, upon execution by the processor, cause performance of a set of operations comprising:
accessing, via a network, a fingerprint and information associated with a playback device, the fingerprint generated by the playback device in response to presentation of content by the playback device;
comparing the fingerprint to one or more reference fingerprints to identify the content, the one or more reference fingerprints corresponding to respective different media;
identifying a break in the content based on the identified content;
selecting an information segment to be inserted in the break in the content based on the information associated with the playback device; and
causing transmission of the information segment to the playback device via the network.

9. The computing system of claim 8, wherein the set of operations further comprises:
identifying the break in the content based on metadata associated with the content.

10. The computing system of claim 8, wherein the set of operations further comprises:
selecting the information segment based on at least one of a ranking of the information segment relative to one or more other information segments or a time window of the break.

11. The computing system of claim 10, wherein the ranking of the information segment is based on a priority of the information segment relative to the one or more other information segments, the priority associated with a timeliness of presenting the information segment.

12. The computing system of claim 8, wherein the set of operations further comprises:
selecting the information segment based on a break type for the break in the content.

13. The computing system of claim 8, wherein the information associated with the playback device includes a type of device of the playback device.

14. The computing system of claim 8, wherein:
the playback device includes at least one of (1) a car stereo system of a car or (2) a mobile device; and
the information segment includes at least one of (a) current traffic information for a current route of travel for the car, (b) a representation of an unread communication from a contact associated with the mobile device, or (c) an advertisement associated with an advertisement campaign of a point of interest in spatial proximity to the playback device.

15. A non-transitory computer-readable storage medium, having stored thereon program instructions that, upon execution by a processor, cause performance of a set of operations comprising:
accessing, via a network, a fingerprint and information associated with a playback device, the fingerprint generated by the playback device in response to presentation of content by the playback device;
comparing the fingerprint to one or more reference fingerprints to identify the content, the one or more reference fingerprints corresponding to respective different media;
identifying a break in the content based on the identified content;
selecting an information segment to be inserted in the break in the content based on the information associated with the playback device; and
causing transmission of the information segment to the playback device via the network.

16. The non-transitory computer-readable storage medium of claim 15, wherein the set of operations further comprises:
identifying the break in the content based on metadata associated with the content.

17. The non-transitory computer-readable storage medium of claim 15, wherein the set of operations further comprises:
selecting the information segment based on at least one of a ranking of the information segment relative to one or more other information segments or a time window of the break.

18. The non-transitory computer-readable storage medium of claim 17, wherein the ranking of the information segment is based on a priority of the information segment relative to the one or more other information segments, the priority associated with a timeliness of presenting the information segment.

19. The non-transitory computer-readable storage medium of claim 15, wherein the set of operations further comprises:
selecting the information segment based on a break type for the break in the content.

20. The non-transitory computer-readable storage medium of claim 15, wherein the information associated with the playback device includes a type of device of the playback device.

* * * * *